Aug. 10, 1937.  N. KASDAN  2,089,833
VANITY CASE
Filed April 24, 1935
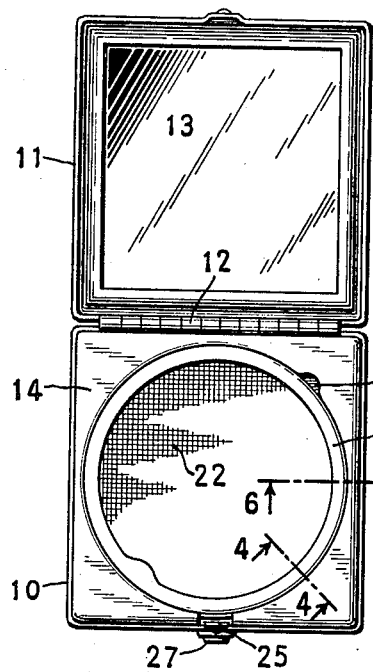
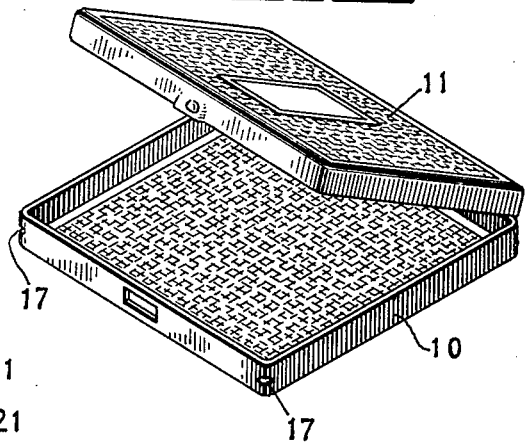
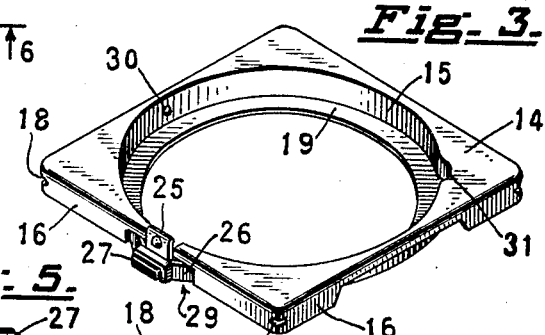
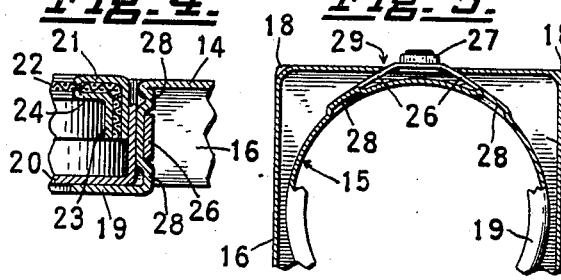
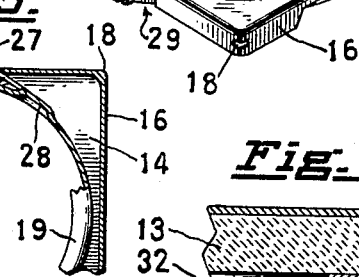
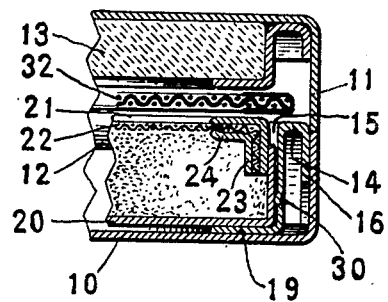
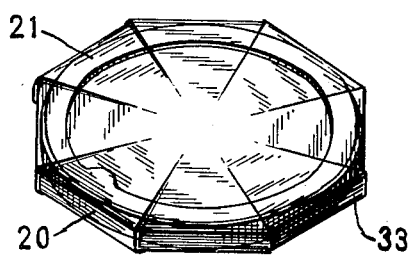
INVENTOR
NATHAN KASDAN,
BY H. R. Johns.
ATTORNEY Patented Aug. 10, 1937

2,089,833

UNITED STATES PATENT OFFICE 2,089,833

VANITY CASE

Nathan Kasdan, New York, N. Y.

Application April 24, 1935, Serial No. 17,911

5 Claims. (Cl. 132—82)

This invention relates to vanity case for loose and cake powder, and has for its object to provide a device of this class capable of being easily and quickly filled with loose powder, with little or no danger of spilling. Another object is to provide a simple and inexpensive means for frictionally retaining either a cake of powder or a receptacle for loose powder within the vanity case.

Referring to the drawing:

Fig. 1 is a top plan view of the loose powder receptacle in position, with the vanity case cover open.

Fig. 2 is a perspective of the casing and cover.

Fig. 3 is a perspective of the member containing the cartridge receiving recess, and adapted to fit within the vanity case.

Fig. 4 is a section on the line 4—4 of Fig. 1.

Fig. 5 is a partial view of the member of Fig. 3 inverted, and showing the latch spring in place.

Fig. 6 is a sectional view on the line 6—6 of Fig. 1 with the cover closed.

Fig. 7 is a perspective of the refilled cartridge of loose powder.

As shown in the drawing, the vanity case illustrated comprises a casing 10 to which is secured the cover 11 by means of the hinge 12. As is customary, the inside of the cover may be provided with a mirror 13. A stamped metal member 14 is provided with a recess 15 in which either a cake of powder or a loose powder receptacle or a cartridge may be received. This member 14 is provided with down-turned edge flanges 16 adapted to frictionally fit within the sides of the casing 10. To hold the member 14 in position, retaining lugs 17 may be stamped inwardly from the corners of the casing 10 for cooperation with corresponding recesses 18 in the corners of the flanges 16. The lower end of the side walls of the recess 15 is provided with a stiffening flange 19 and rigid support for the cup 20, the flange 19 being adapted to rest contiguous the bottom of casing 10 and adapted to support a loose powder receptacle or cup 20. A frame or ring 21 holds mesh of silk bolting cloth, adapted to assist in retaining loose powder within the receptacle 20, yet capable of allowing loose powder to permeate the mesh and be taken up by the puff when the puff is wiped over this mesh. An inner ring 23 frictionally fits the ring 21 and holds the mesh clamped therebetween. The ring 23 has an inwardly extending flange 24 provided with a slightly deformed edge to assist in holding the mesh in place, as shown in Fig. 6. The ring frame 21 slides down the side wall of the cup 20 until the mesh rests on top of the loose powder. As the powder is consumed, the frame 21 slides down inside the cup until contiguous the bottom of the cup. This frame moves down under the influence of gravity and also under the influence of pressure applied by the puff in wiping up loose powder. The mesh 22 is sufficiently flexible so that when the ring 21 rests on the bottom of the cup 20 the mesh may be bent to contact with the bottom of the cup, over a substantial portion thereof, and, therefore, enables most all of the loose powder within the cup to be consumed and taken up on the puff. The latch 25 for retaining the cover 11 closed, is provided with the customary leaf spring arms 26. The actuating portion of the latch extending through the front wall 10, is, instead of being solid, provided with a receptacle 27 to hold an ornamental stone or jewel. To assist in maintaining the arms 26 of the leaf spring in their proper position, portions of the recess wall 15 are stamped out or deformed to provide guides 28 for the spring arms 26. It will be understood these guides or stamped out portions are solid and the wall of the recess 15 is not perforated in forming the guides 28. The front flange 16 is cut away at 29 so that the spring arms may partially extend therethrough. The edges of the cut away portions 29 together with the guides 28 serve to hold the latch and its spring arms in position in the member 14 so that at the time the member 14 is inserted within the casing member 10 it is not necessary to hold the latch spring with one hand while fitting the member 14 inside the casing with the other hand. Instead, it is only necessary to see that the latch is properly supported within the member 14 when the actuating portion 27 of the latch may be inserted through the perforation in the front wall of the casing 10, and the side flanges of the member 14 pressed down until the lugs 17 engage the recess or indentations 18, to positively secure the member 14 in place.

At substantially diametrically opposite portions of the recess wall 15, there are provided knobs or lugs 30 capable of holding a cake of powder in place when in the recess on the flange 19. These knobs or lugs are also adapted to frictionally retain the cup 20 in the recess 15. With the lugs 30 located near the bottom of the recess walls, as shown in the drawing, the cup walls are more rigid than are the recess walls 15, although the recess walls are substantially stiffened by the flange 19. Only slight pressure is necessary to force the cup down into tight contact with the lugs 30, whereby the lugs 30 are slightly pressed apart by the cup, and the intermediate wall portions slightly moved toward each other as a result of such almost imperceptible deformation. The recess 15 is provided with an offset portion 31 so that a knife or other tool may be inserted to assist in lifting the cup member 20 out of the recess 15 when it is desired to insert a new loose powder cartridge.

Loose powder for this vanity case is preferably sold in the form of cartridges adapted to quickly be inserted for refilling the box with loose powder. Such a cartridge comprises the desired amount of loose powder inside the cup 20, held in place to some extent by the frame 21 and the mesh 22, and all enclosed within the wrapper 33 of glassine or other appropriate paper. The paper not only prevents powder leakage through the mesh but holds the mesh and frame within the cup. Before inserting one of these cartridges in the recess 15, the wrapping paper 33 is preferably torn off from around the cup and ring. This vanity case is so proportioned that a puff 32 may be retained by the cover and the ring and mesh when the cover is closed. In this way, the puff also assists in preventing unnecessary leakage through the mesh. The cover, when closed, may also prevent withdrawal of either the frame 21 or the cup from the body portion of the casing and recess 15.

One advantage of this invention resides in the adaptability of this vanity case for receiving either loose powder within the cup 20, or cake powder within the space occupied by the cup. The use of a cartridge for refilling is an especially simple and convenient operation since the cartridge is inserted through the top of the powder receiving recess when the cover is open, and it is not necessary to open any part of the back or bottom of the casing. The lugs 30 constitute a yieldable holding means for the cup 20 and also may function to retain a cake of powder in place.

The inner edge of the frame 21 may also be deformed as shown in the drawing opposite the deformed edge of the flange 24, to assist in holding the mesh in position. Such deforming of the inner edge of the frame 21 also enhances the appearance of the frame and lessens the likelihood of a user's fingers getting scratched on this inner edge, and also lessens the likelihood of powder being taken from the puff surface as might occur if the puff were wiped over a sharp edge after wiping up powder.

When the lugs 30 are located adjacent the bottom of the cup 20, and the recess walls will yield or become distorted slightly instead of having the cup walls become distorted, it may be seen that this connection for holding the cup in position within the vanity case is free from danger of distorting the cup and affecting the free sliding fit of the mesh holding frame.

I claim:

1. A vanity case having a walled recess, a cup member adapted to be inserted in the recess from the top or front of the case, the recess side wall being provided with a lug for yieldably cooperating with the side of the cup member adjacent the bottom thereof, the cup being more rigid where engaged by said lug than is said recess wall, the sides of said cup member being substantially straight on the inner surface, a mesh holding frame adapted to slide down the inside of the cup member.

2. A vanity case having a walled recess, a cup member adapted to be inserted in the recess, a yieldable connection between the cup and recess side wall adapted to cause, on insertion of the cup in the recess, a slight distortion of the recess walls with substantially no distortion of the cup walls, the inner surface of the cup sides being substantially straight, and a frame having a free sliding fit along the inside of the cup, whereby said yieldable connection is substantially free from danger of impeding the sliding movement of said frame.

3. A vanity case having a walled recess, a cup member adapted to be inserted in the recess from the top or front of the case, the recess side wall being provided with a lug for yieldably cooperating with the side of the cup member adjacent the bottom thereof, the cup being more rigid where engaged by said lug than is said recess wall, the sides of said cup member being substantially straight on the inner surface, a mesh holding frame adapted to slide down the inside of the cup member, said frame having a flange extending below the mesh and the mesh being flexible enough to be bent down an amount equal to about the depth of said flange.

4. A vanity case having a walled recess, a cup member adapted to be inserted in the recess from the top or front of the case, the recess side wall being provided with a lug for yieldably cooperating with the side of the cup member adjacent the bottom thereof, the cup being more rigid where engaged by said lug than is said recess wall, the sides of said cup member being substantially straight on the inner surface, a mesh holding frame adapted to slide down the inside of the cup member, the side walls of said recess being provided with an offset within which a tool may be inserted to release the cup member when clamped by said lug.

5. A vanity case having a walled recess, a cup member adapted to be inserted in the recess from the top or front of the case, the recess side wall being provided with a lug for yieldably cooperating with the side of the cup member adjacent the bottom thereof, the cup being more rigid where engaged by said lug than is said recess wall, the sides of said cup member being substantially straight on the inner surface, a mesh holding frame adapted to slide down the inside of the cup member, the mesh frame having the edges thereof contiguous the exposed portion of the mesh deformed to assist clamping the mesh.

NATHAN KASDAN.